(12) United States Patent
Flores et al.

(10) Patent No.: US 10,601,768 B2
(45) Date of Patent: Mar. 24, 2020

(54) AUTOMATED STEADY STATE TRAFFIC MANAGEMENT

(71) Applicant: Verizon Digital Media Services Inc., Dulles, VA (US)

(72) Inventors: Marcel Eric Schechner Flores, Los Angeles, CA (US); Colin Rasor, Santa Monica, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 305 days.

(21) Appl. No.: 15/483,154

(22) Filed: Apr. 10, 2017

(65) Prior Publication Data

US 2018/0295063 A1    Oct. 11, 2018

(51) Int. Cl.
*H04L 29/12* (2006.01)
*H04L 12/24* (2006.01)
*H04L 12/26* (2006.01)

(52) U.S. Cl.
CPC ...... *H04L 61/1511* (2013.01); *H04L 41/5025* (2013.01); *H04L 41/147* (2013.01); *H04L 41/509* (2013.01); *H04L 41/5009* (2013.01); *H04L 43/0817* (2013.01); *H04L 43/0882* (2013.01)

(58) Field of Classification Search
CPC ......... G06F 9/54; H04L 41/083; H04L 67/10; H04L 67/104; H04L 67/1097; H04L 67/2842; H04L 69/40; H04L 41/147; H04L 41/5009; H04L 41/5025; H04L 41/509; H04L 43/0817; H04L 43/0882; H04L 61/1511

See application file for complete search history.

(56) References Cited

U.S. PATENT DOCUMENTS

| 9,819,567 B1* | 11/2017 | Uppal | H04L 45/22 |
| 9,900,402 B1* | 2/2018 | Li | H04L 67/32 |
| 2012/0233329 A1* | 9/2012 | Dickinson | H04L 67/2814 709/226 |
| 2013/0219020 A1* | 8/2013 | McCarthy | H04L 29/12066 709/218 |
| 2013/0339519 A1* | 12/2013 | Lientz | H04L 41/0896 709/224 |
| 2016/0164761 A1* | 6/2016 | Sathyanarayana | H04L 65/60 709/219 |

* cited by examiner

*Primary Examiner* — Gil H. Lee
(74) *Attorney, Agent, or Firm* — Ansari Katiraei LLP; Arman Katiraei; Sadiq Ansari

(57) ABSTRACT

Automated steady state traffic management is provided for a distributed platform through immediate or real-time simulation of the capacity and performance impacts associated with shifting different load increments to different Points-of-presence (PoPs) of the distributed platform and by automatic and dynamic traffic management reconfiguration in response to an optimal set of changes identified from the simulation. A system produces data models to track the current distributed platform state and detect deviates from the steady state. Using the data models and scoring functions, the system scores the impact that different shifts of load to different destinations have on the overall distributed platform. The scoring reveals the optimal set of traffic management configuration changes that restore the steady state with the least capacity and performance impact.

19 Claims, 9 Drawing Sheets

| | | PoP 1 760 | PoP 2 770 | PoP 3 780 | PoP 4 790 |
|---|---|---|---|---|---|
| 740 | 750 | Current load 95% | Current load 82% | Current load 64% | Current load 78% |
| 30 | 55 | | 5% shift | 0% shift | 0% shift |
| 45 | 50 | | 0% shift | 5% shift | 0% shift |
| 35 | 45 | | 0% shift | 0% shift | 5% shift |
| 45 | 65 | | 2.5% shift | 2.5% shift | 0% shift |
| 33 | 60 | | 2.5% shift | 0% shift | 2.5% shift |
| 37 | 55 | | 0% shift | 2.5% shift | 2.5% shift |
| 5 | 10 | | 10% shift | 0% shift | 0% shift |
| 75 | 60 | | 0% shift | 10% shift | 0% shift |
| 30 | 55 | | 0% shift | 0% shift | 10% shift |
| 60 | 80 | | 5% shift | 5% shift | 0% shift |
| 50 | 75 | | 5% shift | 0% shift | 5% shift |
| 70 | 55 | | 0% shift | 5% shift | 5% shift |
| 65 | 60 | | 3.3% shift | 3.3% shift | 3.3% shift |

FIG. 7

AUTOMATED STEADY STATE TRAFFIC MANAGEMENT

BACKGROUND ART

A distributed platform provides access to content and services from different points-of-presence (PoPs) dispersed across the Internet. The same set of content and services can typically be accessed from any of the distributed platform PoPs. The replicated access optimizes delivery by increasing total capacity for the content and services while also localizing delivery of the content and services to requestors that are geographically proximate to a respective PoP.

Access to the PoPs is controlled by the traffic management functions of the distributed platform. The traffic management functions are typically implemented in part with Domain Name System (DNS) servers. One or more DNS servers resolve client queries directed to content and services served from the distributed platform with addressing directed to different PoPs that are selected according to a configured traffic management scheme. The distributed platform can be a content delivery network (CDN), a cloud service provider, or any operator of a distributed set of servers, wherein the distributed set of servers collectively function to serve content or services over a digital network in response to different client requests for those content or services.

Maintaining a steady state across the distributed platform PoPs is a significant challenge. Expected and unexpected demand spikes regularly occur across the different PoPs and disrupt the steady state. The demand spikes can create fluctuations in the load, cache footprint, latency, and other performance or resource related metrics that each PoP experiences at any given time. Expected demand spikes can be due to the time-of-day at which requestors access content from the different PoPs as well as new content becoming accessible. Unexpected demand spikes can be due to unforeseen viral content, unforeseen events, attacks, network failures, or server failures in the PoPs.

Static traffic management policies of the distributed platform in combination with these demand spikes cause the steady state deviations across the distributed platform PoPs. For instance, Anycast or some form of requestor Internet Protocol (IP) mapping at the Domain Name System (DNS) level determines how client issued requests are distributed across the PoPs. The primary objective of these static traffic management policies is to optimize content delivery performance by routing requestors to the PoP that is geographically proximate to them. This however does not account for demand spikes that occur in the different regions served by the different PoPs, whereby the demand spikes can lead to an unbalancing of the steady state in two or more of the distributed platform PoPs.

Accordingly, there is a need for the distributed platform to implement dynamic traffic management policies. Dynamic traffic management would allow the distributed platform to respond to expected and unexpected demand spikes and restore the PoPs to a steady state by shifting traffic in between the PoPs as dictated by current traffic patterns. The dynamic traffic shifting can be used to rebalance loads between different PoPs, rebalance the cache footprint or cache utilization across the PoPs, improve latency, and rebalance other measureable metrics relating to the distributed platform's ability to serve content and services.

Failure to do so could result in degraded performance at one or more PoPs. Degraded PoP performance can manifest as slower response times (e.g., greater latency), dropped requests, and even resource failures. In the worst case, static traffic management policies combined with excess demand could render a PoP unresponsive or inaccessible.

Nevertheless, dynamic traffic management policies can produce unexpected ramifications across the distributed platform. In some cases, a DNS reconfiguration to restore the steady state at one PoP can create a chain reaction in which the steady state at another PoP becomes unbalanced as a result of the DNS reconfiguration, thereby requiring additional reconfigurations or traffic shifts. More generally, it is difficult to gauge the actual load, cache, latency, or other performance or resource impact any single traffic management change has locally on a PoP and globally across all distributed platform PoPs.

Humans cannot account for all the variables affected by a traffic management change. Humans are also slow to react to a sudden spike and may act hastily creating the undesired chain reaction across the distributed platform. Accordingly, there is further a need to automate any such traffic management function and remove the human element.

BRIEF DESCRIPTION OF THE DRAWINGS

A preferred embodiment for automated steady state traffic management will now be described, by way of example only, with reference to the accompanying drawings in which:

FIG. 7 conceptually illustrates the perturbation scoring in accordance with some embodiments.

DETAILED DESCRIPTION

Disclosed is a system for automated steady state traffic management in a distributed platform. The system automatically restores the distributed platform steady state in response to a regional traffic spike. The system simulates the impact across the entire distributed platform resulting from shifting different load increments from an area of the distributed platform deviating from the steady state to one or more other areas. The system then implements the shift increment to the one or more other areas that optimally restores the steady state locally in the deviating area and globally across all areas of the distributed platform based on the simulations. The load shifting is dynamic by virtue of temporary Domain Name System (DNS) reconfiguration, wherein the DNS reconfiguration modifies the base or default traffic management operations of the distributed platform.

Figure 1:
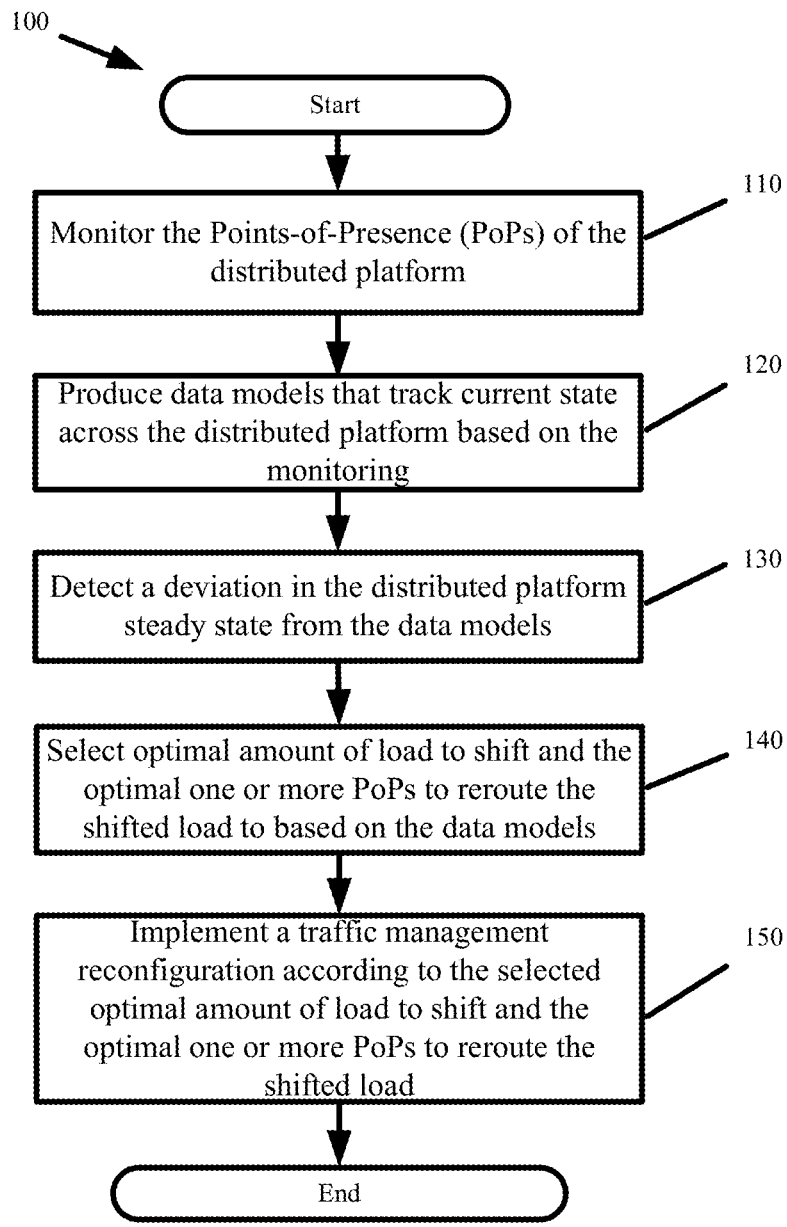
FIG. 1 presents a process for automated steady state traffic management in a distributed platform in accordance with some embodiments.

FIG. 1 presents a process 100 for automated steady state traffic management in a distributed platform in accordance with some embodiments. The process 100 commences by monitoring (at 110) different Points-of-Presence (PoPs) of the distributed platform. The process measures one or more metrics related to performance or resource consumption at each of the PoPs. In some embodiments, the monitoring step involves monitoring one or more of the load, number of requests per unit of time, request counts for different customer content or services, throughput, bytes served per unit of time, bandwidth utilization resulting from different requests, cache utilization, cache footprint, latency, number of retransmissions, errors, or network link failures at the distributed platform PoPs.

The process produces (at 120) data models based on the monitoring. The data models track the current state across the distributed platform based on the one or more monitored metrics. In some embodiments, the data models specifically identify an amount of overloaded or excess capacity at each PoP and load contributions from different domains, content, or services accessible at each PoP.

From the data models, the process detects (at 130) a deviation in the distributed platform steady state, and more specifically, a deviation in the steady state of at least one particular PoP. The deviation occurs when there is excess load or a load spike at the particular PoP.

In response to a detected deviation, the process scores the impact that different shifts of load away from the particular PoP to one or more other PoPs have on the overall distributed platform. The scoring is conducted based on the data models and tracking of the distributed platform current state therein.

The process selects (at 140) the optimal amount of load to shift and the optimal one or more PoPs to reroute the shifted load to based on the scoring. In some embodiments, the selection involves selecting one or more domains, requestor Internet Protocol (IP) addresses, requests from one or more Internet Service Providers (ISPs), or requests originating from one or more Autonomous System (AS) numbers to resolve away from the particular PoP. In some embodiments, the selection of the one or more PoPs to receive the shifted load involves resolving the requests representative of the optimal load to the IP addresses or virtual IP (VIPs) addresses of the optimal one or more other PoPs instead of the addressing of the particular PoP.

The process then implements (at 150) a traffic management reconfiguration according to the selected optimal amount of load to shift and the optimal one or more PoPs to reroute the shifted load. The traffic management reconfiguration involves dynamically modifying one or more DNS servers that control distributed platform access, wherein the modifications bring about the shifting of the optimal amount of load from the particular PoP to the one or more other PoPs. The traffic management reconfiguration temporarily modifies traffic management operations of the distributed platform away from a base or default configuration. In doing so, a subset of requests or domains that would resolve to the particular PoP under the base or default configuration now resolve to the one or more optimal PoPs selected to handle the shifted load, wherein the subset of requests represents the optimal amount of load to be shifted away from the particular PoP in order to restore the steady state at the particular PoP without negatively impacting the steady state at other PoPs or the overall distributed platform.

In some embodiments, the traffic management reconfiguration involves creating new zone files to control or modify DNS operation for the content and services accessed from the distributed platform. The zone files can introduce or change A, CNAME, ALIAS, or URL records for the subset of rerouted requests or domain names. The reconfiguration and corresponding changes can be localized to the subset of DNS servers that resolve requests to the particular PoP or that resolve requests originating from the region serviced by the particular PoP. The reconfiguration involves changing A, CNAME, ALIAS, or URL records for the subset of rerouted requests or domains from the addressing of the particular PoP to the addressing of the one or more optimal PoPs.

In some embodiments, the traffic management reconfiguration involves setting rules that modify DNS server request resolution based on the IP addressing, ISP, or AS of the requestor. For example, the reconfiguration can cause a particular DNS server to resolve requests from 200.100.34.0/24 addresses to a first PoP while all requests from all other requestors are resolved to a default or base second PoP.

In some embodiments, the traffic management reconfiguration involves pulling or removing routes or addressing advertised from an overloaded PoP. For instance, Border Gateway Protocol (BGP) route advertisements can stop advertising an IP address from which clients request a subset of content or services from a steady state deviating PoP. The network will reconfigure to route those requests to a more distant PoP that advertises the same IP address as per Anycast operation. The BGP route advertisements are generated and sent from gateway routers of each PoP. Thus, a gateway router associated with the steady state deviating PoP would remove one or more addresses from its route advertisements in order to shift load away from the steady state deviating PoP. Meanwhile, gateway router(s) associated with one or more other PoPs that absorb the shifted load will advertise the same one or more addresses removed by the gateway router of the steady state deviating PoP.

Figure 2:
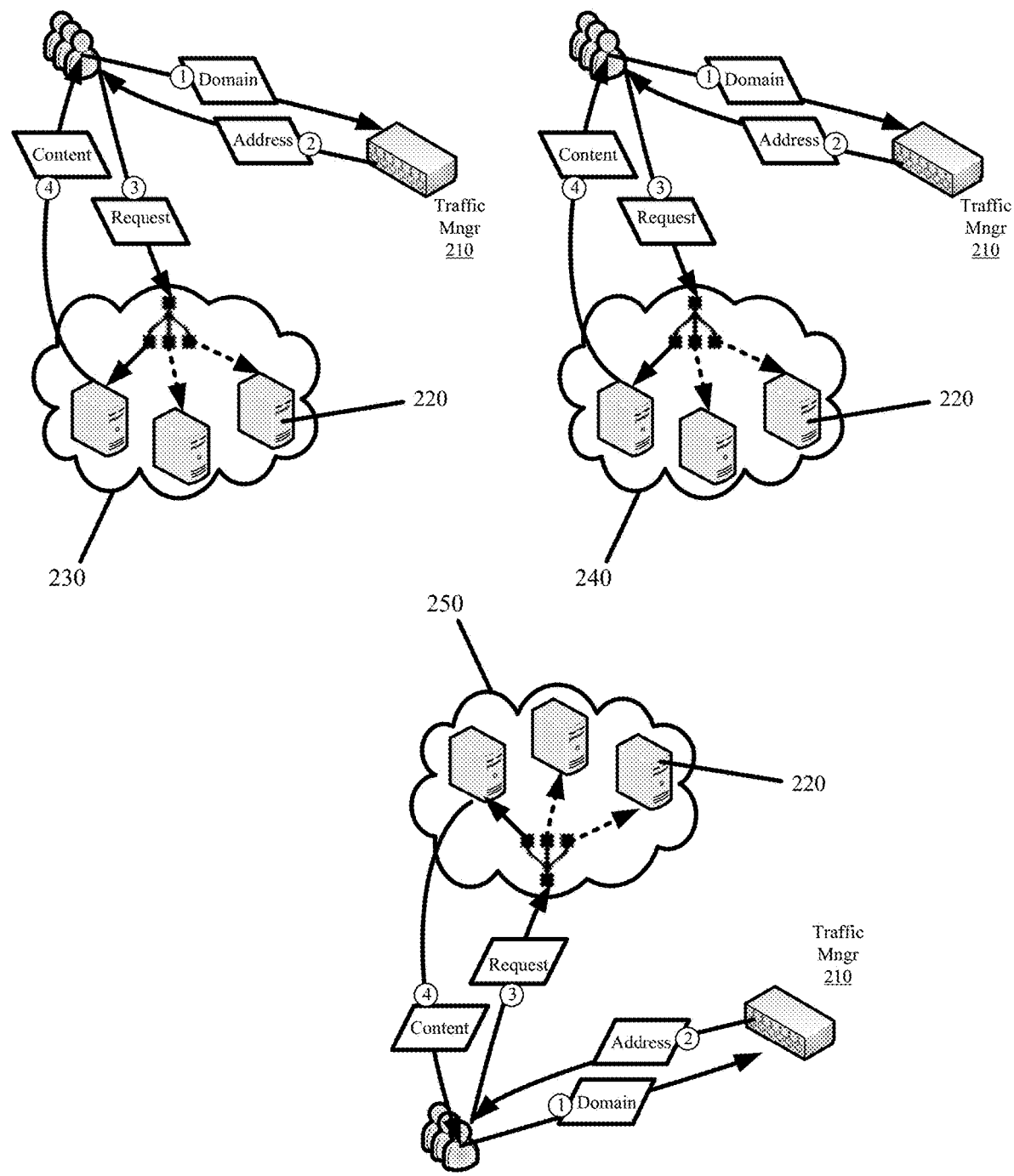
FIG. 2 presents an exemplary architecture for a distributed platform of some embodiments.

FIG. 2 presents an exemplary architecture for the distributed platform. The distributed platform includes traffic management servers 210 and different sets of distribution servers 220 operating in different distributed platform PoPs 230, 240, and 250. In some embodiments, the traffic management servers include one or more DNS servers. The figure further illustrates base or default operation of the traffic management servers 210, whereby the servers 210 resolve client content or service requests directed to different sets of domains with addressing to a nearest distributed platform PoP. More specifically, a client generates a DNS query that is directed to a domain hosted or accessed from the distributed platform. The traffic management servers 210 resolve the DNS query by returning the address for the PoP that is nearest to the client's location. The client then issues a content request to the resolved PoP using the returned address. A load balancer or director distributes the request to a distribution server within the PoP and the distribution server returns the requested content back to the client.

Figure 3:
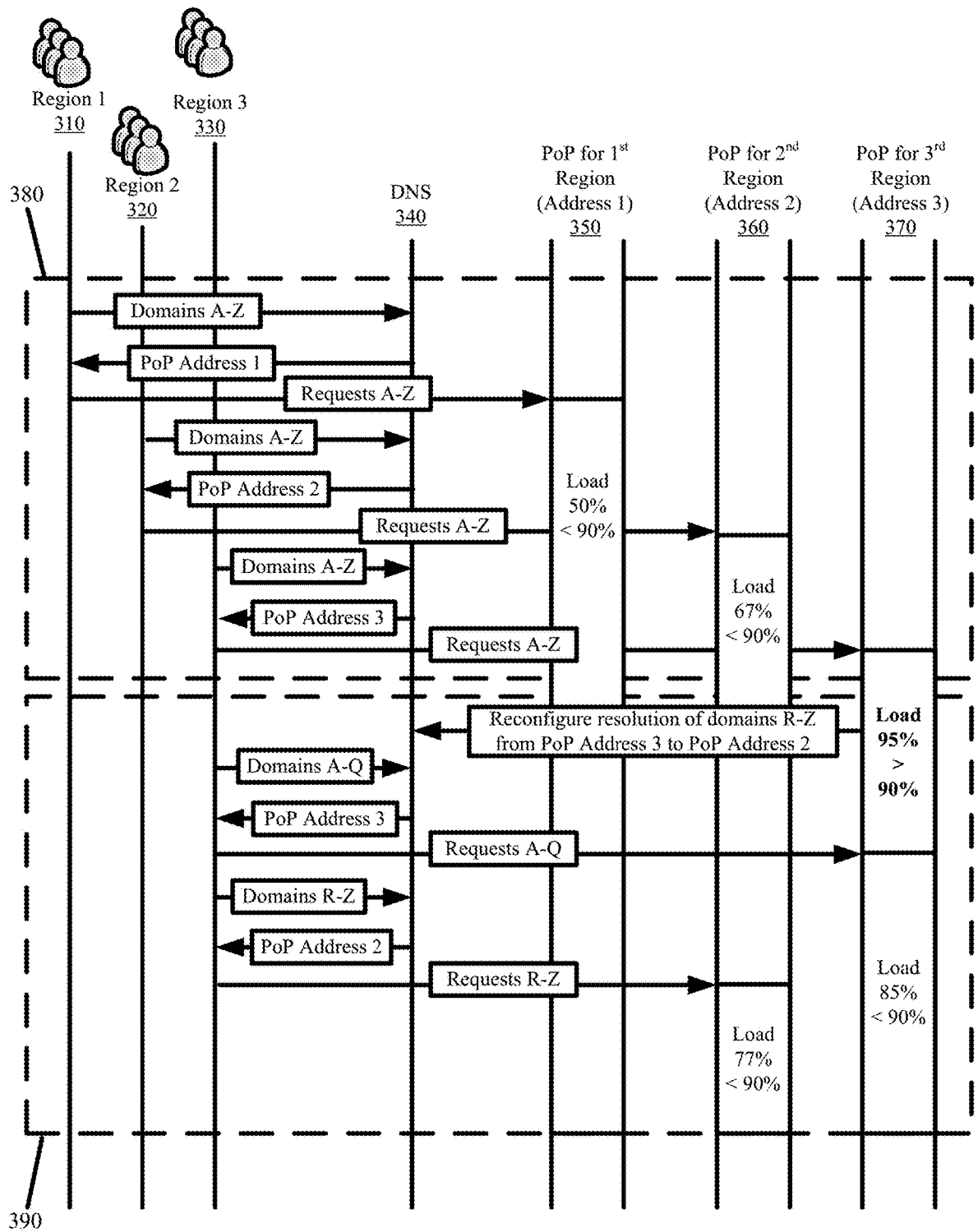
FIG. 3 conceptually illustrates maintaining the distributed platform steady state in accordance with some embodiments by modifying the base or default traffic management configuration in order to rebalance a deviating load caused by a regional demand spike.

FIG. 3 conceptually illustrates maintaining the distributed platform steady state in accordance with some embodiments by modifying the base or default traffic management configuration in order to rebalance a deviating load caused by a regional demand spike. The figure illustrates clients in three different regions 310, 320, and 330 sending DNS queries to DNS servers 340 of the distributed platform.

During a first time 380, the DNS servers 340 have a base configuration and resolve DNS queries from the clients of the first region 310 to a first PoP 350 of the distributed platform, DNS queries from the clients of the second region 320 to a second PoP 360 of the distributed platform, and DNS queries from the clients of the third region 330 to a third PoP 370 of the distributed platform, wherein each of the resolved DNS queries is directed to one or more domains that are accessed from the distributed platform PoPs 350-370. The clients 310-330 then send content requests to the PoPs 350-370 identified in the queries resolved according to the base configuration.

The monitoring of each PoP 350-370 during the first time 380 reveals a traffic spike at the third PoP 370. In particular, the load at the third PoP 370 exceeds a threshold, wherein the threshold indicates load levels at which demand may exceed capacity of the PoP 370 or potentially degrade performance at the PoP 370.

To restore the distributed platform steady state and rebalance load across the PoPs 350-370, the distributed platform performs a DNS reconfiguration at the start of a subsequent second time 390. The reconfiguration modifies DNS query resolution operation. In particular, the reconfiguration modifies a subset of the DNS servers 340 that receive DNS queries from the clients in the third region 330. The reconfiguration causes the subset of DNS servers 340 to resolve a subset of the domains from the third PoP 370 to the second PoP 360. This traffic management change shifts excess load away from the third PoP 370 to the different second PoP 360 during the second time 390, wherein the second PoP 360 has excess capacity and is expected to provide the next best performance for the shifted traffic or load. Consequently, load at the third PoP 370 during the subsequent second time 390 drops below the threshold while load at the second PoP 360 increases but remains below the threshold.

The system for implementing the automated steady state traffic management of some embodiments is comprised of a state engine and a policy engine. The state and policy engines execute on the same physical machine or two separate machines, wherein the machines are special-purposed servers or physical computing resources of the distributed platform for implementing the automated steady state traffic management.

Figure 4:
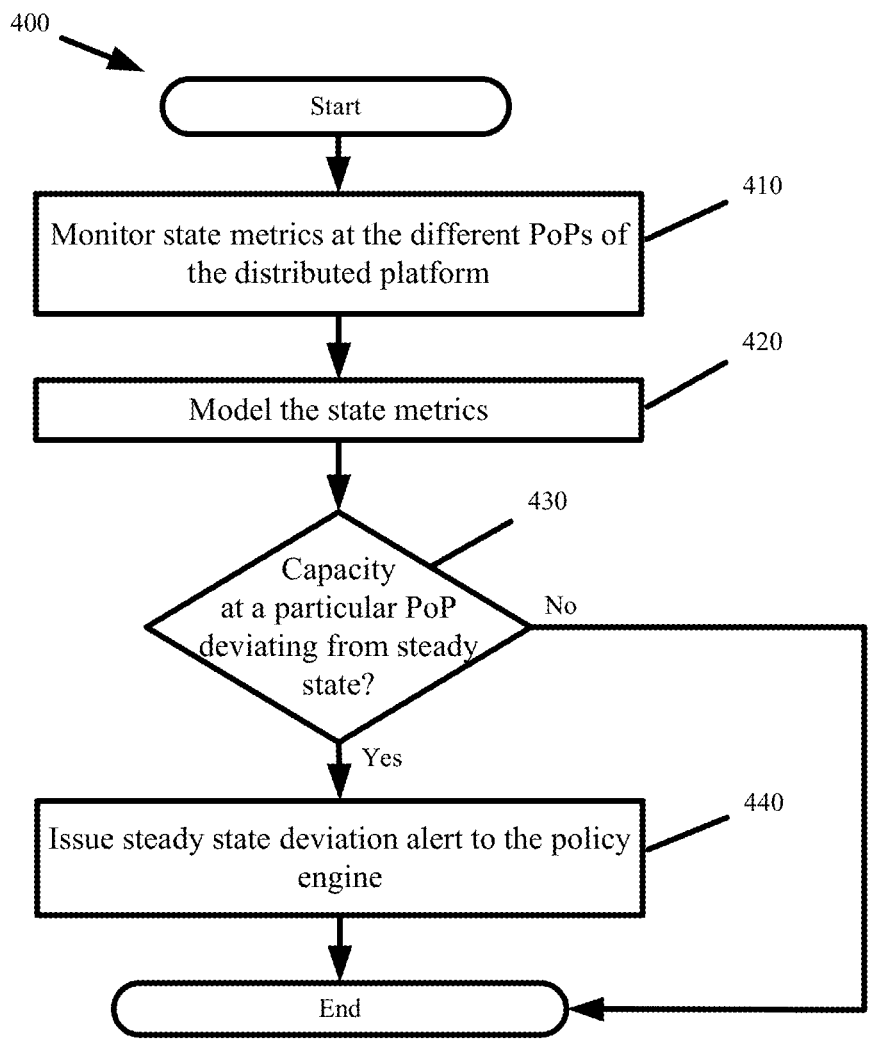
FIG. 4 presents a process by which the state engine tracks the distributed platform current state in accordance with some embodiments.

The state engine produces the data models tracking the distributed platform current state. FIG. 4 presents a process 400 by which the state engine tracks the distributed platform current state in accordance with some embodiments.

The process commences with the state engine monitoring (at 410) one or more state metrics for performance or resources at the different distributed platform PoPs, wherein the state metrics represent the current state at each PoP. The monitoring is continually or periodically performed to account for any steady state deviations occurring as a result of fluctuating demand across the distributed platform PoPs. In some embodiments, the state engine polls the various PoPs, and in some cases, the individual servers within each PoP, to obtain the state metrics. In some other embodiments, the PoPs or PoP servers are configured to periodically send the state metrics to the state engine. As noted above, the state metrics encompass one or more of load, number of requests per unit of time, request counts for different customer content or services, throughput, bytes served per unit of time, bandwidth utilization, cache utilization, cache footprint, latency, number of retransmissions, errors, or network link failures at the distributed platform PoPs.

The process models (at 420) the state metrics. The modeling compiles the state metrics and produces the data models that provide different granular views of state across the distributed platform. In some embodiments, the data models represent total current load at each PoP as well as load contributions of each domain or customer to the overall PoP load. These data models are formed from aggregating requests directed to different domains served by the PoP and compiling the percentage contribution to the overall PoP load that results from demand of each domain, wherein the demand from each domain can be determined based on request counts, the total server time consumed in responding to requests for the different domains, bandwidth utilization associated with requests for the different domains, etc.

In some embodiments, the modeling involves generated a tree-like structure with hierarchical nodes representing state at the different levels throughout the distributed platform. When modeling load, a data model root node represents consumed capacity (i.e., load) or available capacity across the distributed platform. Child nodes under the root node represent consumed capacity or available capacity at each of the distributed platform PoPs. Grandchildren nodes represent consumed capacity at each PoP by different domains or customers/content providers whose content is served from the respective PoP.

The process compares the modeled state for the different PoPs against a set of thresholds in order to determine (at 430) whether the current state at a particular PoP deviates from a steady state. The set of thresholds may specify a different threshold for each PoP of the distributed platform when the different PoPs have different sets of resources or are tasked with delivering different sets of content.

The distributed platform deviates from its steady state when the monitored metrics at one or more of the PoPs (as identified from the respective data models) violate or exceed one or more thresholds configured for the respective PoP. If the modeled state for the different PoPs does not violate or exceed the set of thresholds, the process ends or restarts, wherein restarting updates the distributed platform current state and the corresponding data models. If the modeled state for a particular PoP violates or exceeds a threshold configured for the particular PoP, the process issues (at 440) a steady state deviation alert to the policy engine. The alert notifies the policy engine of the anomalous conditions at the particular PoP causing the distributed platform to deviate from its steady state. In some embodiments, the alert sends the data models to the policy engine. The alert further triggers the policy engine to restore the distributed platform to a steady state.

Figure 5:
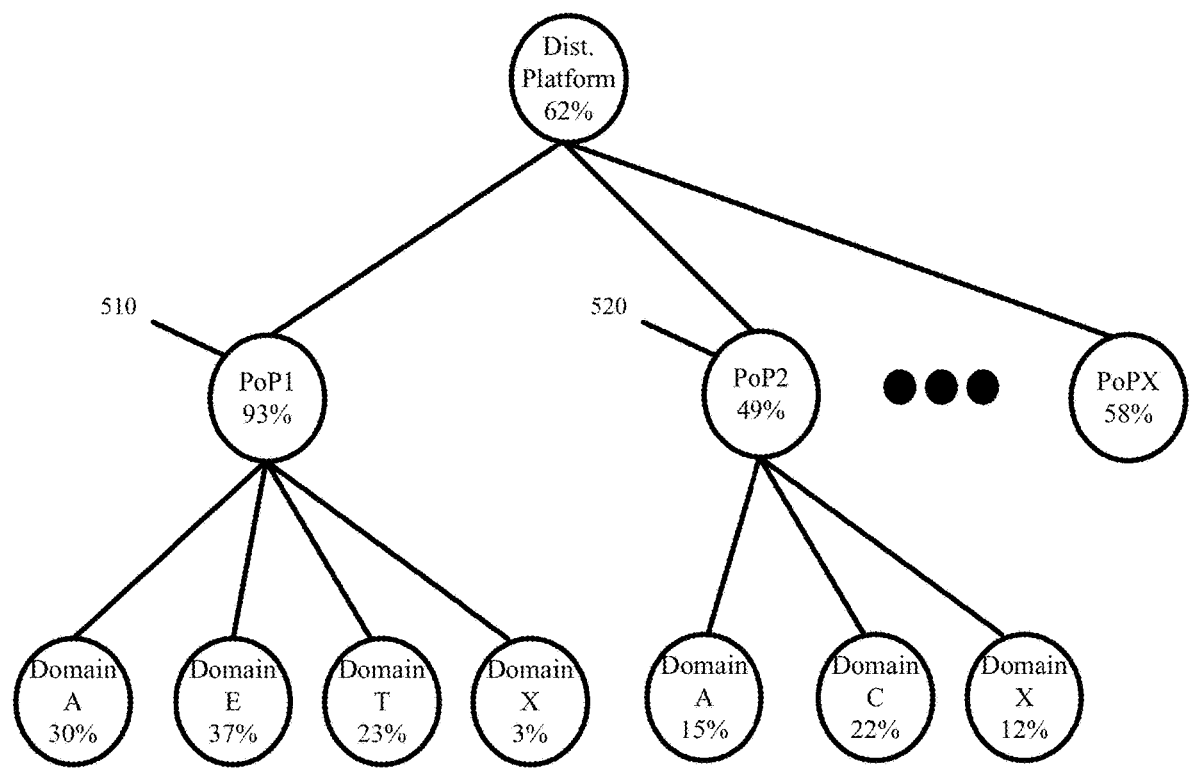
FIG. 5 conceptually illustrates data models for two PoPs of a distributed platform generated based on capacity metrics compiled from distribution servers operating in each of the two PoPs.

FIG. 5 conceptually illustrates data models for two PoPs of a distributed platform generated based on state metrics compiled from distribution servers operating in each of the two PoPs. The data models demonstrate a first PoP 510 with 93% total load and a second PoP 520 with 49% total load. The load of each PoP 510 and 520 is exploded on a per domain basis. In particular, each domain node represents the percentage load contribution from a corresponding domain to the total PoP load. The percentage load contributions identified in the data models assist in restoring the steady state by identifying the subset of domains that can be resolved to a different PoP in order to shift a desired amount of load from a PoP with DNS or traffic management reconfiguration.

In response to a state engine generated alert, the capacity engine determines an optimal amount of traffic to shift away from an overloaded PoP, the manner with which to achieve the shift of the optimal amount of traffic, and an optimal destination to receive the traffic that is shifted away from the overloaded PoP. The policy engine actions are dynamically determined based on the current state of the distributed platform. In other words, the policy engine is not statically configured to take the same action whenever a particular PoP is overloaded. Instead, the policy engine takes dynamic actions that vary the amount of traffic that is shifted, the domains that are selected to realize the load shift as part of the traffic management reconfiguration, and the one or more other PoPs that are to receive the shifted traffic.

As noted above, the dynamic actions are implemented by overriding base or default traffic management operation of the distributed platform. This includes overriding Anycast or DNS operation. The dynamic actions include creating and distributing new zone files to the DNS servers so as to change A, CNAME, or other records that control what traffic is routed to what PoP. The dynamic actions can further include pulling or removing route advertisements. For instance, Border Gateway Protocol (BGP) route advertisements can stop advertising an IP address from which clients request content or services from an overloaded PoP.

Figure 6:
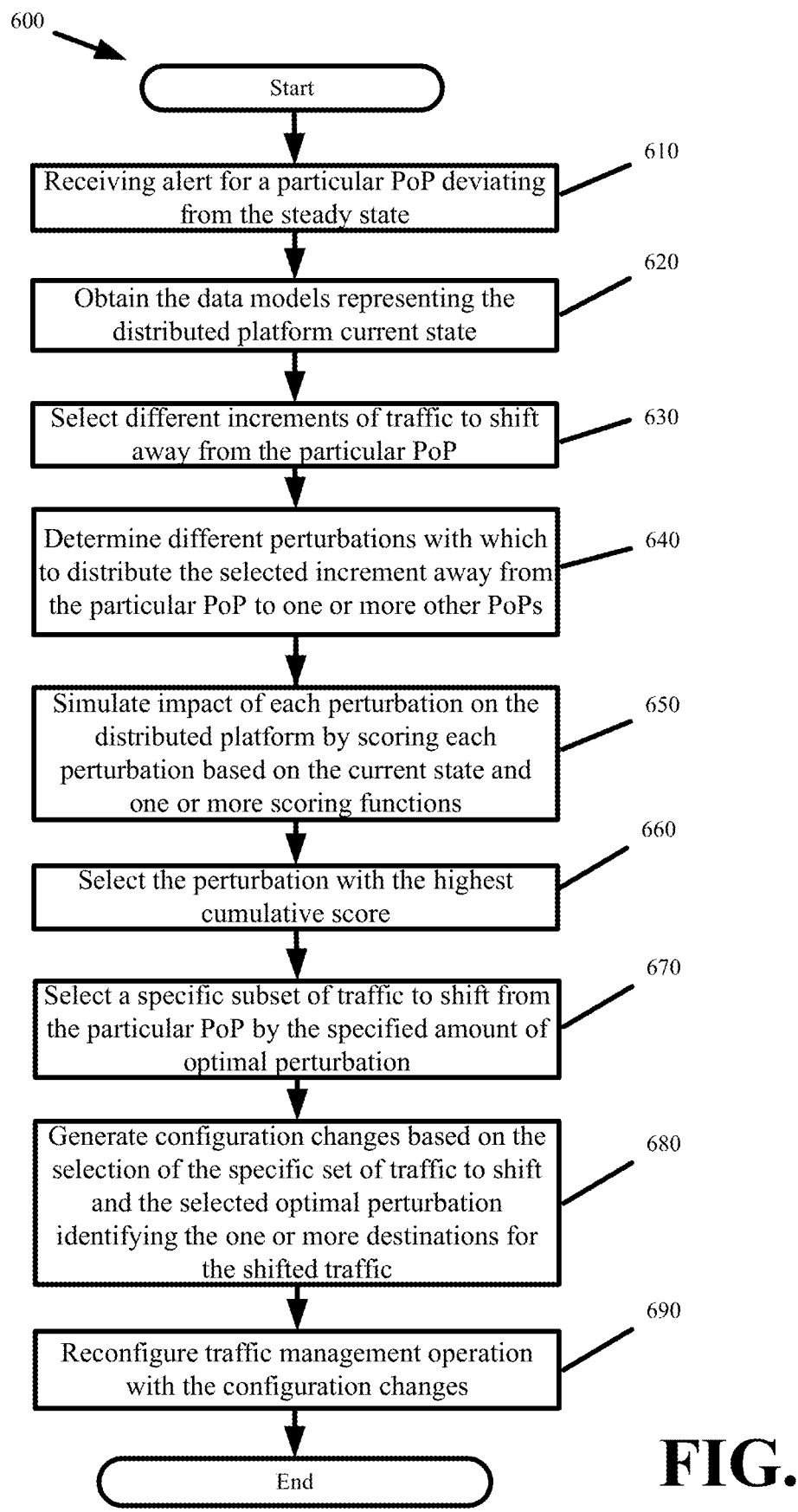
FIG. 6 presents a process by which the policy engine automatically and dynamically returns the distributed platform to a steady state in accordance with some embodiments.

FIG. 6 presents a process 600 by which the policy engine automatically and dynamically returns the distributed platform to a steady state in accordance with some embodiments. The process commences in response to the policy engine receiving (at 610) an alert from the state engine. The alert identifies at least one particular PoP that receives demand in excess of threshold capacity, where the cache footprint violates a threshold, experiences average latency above threshold latency, etc. As part of the alert or separate from the alert, the process obtains (at 620) the data models representing the distributed platform current state.

The process selects (at 630) different increments of traffic to shift away from the particular PoP. The increments can be defined as percentages, bandwidth, or request counts as some examples.

For each selected increment of traffic to shift, the process determines (at 640) different perturbations with which to distribute the selected increment away from the particular PoP to one or more other PoPs. The process then simulates (at 650) the capacity and performance impact of each perturbation on the distributed platform by scoring each perturbation based on the distributed platform current state as represented by the data models and further based on one or more scoring functions.

The scoring functions simulate and quantify the state impact that each perturbation has on the distribution platform. The scoring functions account for the distributed platform current state as identified in the data models and assign lower scores to any traffic shift from a first PoP to at least a second PoP that leaves the first PoP deviating from the steady state (e.g., overloaded) and/or causes the second PoP to also deviate from a steady state (e.g., become overloaded) as a result of the traffic shift. Conversely, the scoring functions assign higher scores to any traffic shift from a first PoP to at least a second PoP that restores or brings the greatest number of PoPs to the steady state and that does not unnecessarily shift traffic beyond what is needed to return the distributed platform to the steady state. With respect to load, the traffic shifts that lower load or demand at all PoPs below the threshold amounts and that do not unnecessarily shift load beyond what is needed to return the distributed platform to the steady state are scored higher. As a specific example, the steady state can be restored by shifting 4% of traffic from a first PoP to a second PoP. The scoring functions prioritize and assign a higher score to a first perturbation that shifts 5% of traffic from the first PoP to the second PoP than a second perturbation that shifts 10% of traffic from the first PoP to the second PoP, because the second perturbation produces a larger deviation to the default traffic management operation and shifts a larger amount of traffic than is needed to achieve the same result.

The scoring functions also simulate and quantify the performance impact of each perturbation on the distributed platform. In some such embodiments, the scoring functions account for the number of shifted domains and the position of the destinations that are to receive the shifted traffic. Shifting traffic from a first PoP to one or more other PoPs can create cache pollution and reduce cache-hit ratios at the one or more other PoPs which, in turn, reduces performance at each of the other PoPs. By minimizing the traffic shift to a fewer number of PoPs, these performance degradations can be minimized. Accordingly, the scoring functions prioritize restoring the steady state with the minimal number of traffic configuration changes and minimal impact to other PoPs. In other words, a first perturbation that restores the steady state by shifting traffic to one alternative PoP is provided a higher score than a second perturbation that restores the steady state by shifting traffic to two or more alternative PoPs. A large factor on performance is also the number of network hops that traffic traverses. The scoring functions account for this performance impact by prioritizing traffic shifts from a steady state deviating PoP to other PoPs that are geographically closest to the steady state deviating PoP. In other words, a first perturbation that restores the steady state by shifting traffic from a first PoP to a second PoP is provided a lower score than a second perturbation that restores the steady state by shifting traffic from the first PoP to a third PoP that is closer to the first PoP than the second PoP. Other performance factors accounted for by the scoring functions include route performance (e.g., bandwidth, latency, etc.), network congestion, network reliability, cost, and previous instances in which different domains have been shifted as some examples.

In some embodiments, reducing the number of destinations does not always coincide with minimizing the position of the alternative destinations or how close each perturbation returns the distributed platform to a steady state. In some such embodiments, the scoring functions generate separate scores for each factor with the sum of scores providing a cumulative value for identifying the best set of changes for restoring the distributed platform to a steady state.

The scoring provides the policy engine with a comprehensive view of all possible sets of changes to restore the steady state and the impact that each set of changes has on the distributed platform. In this manner, the policy engine simulates capacity and performance impact across the distributed platform PoPs as a result of restoring the steady state with the different traffic shifting combinations of the different perturbations.

The process selects (at 660) the set of changes or perturbation with the highest cumulative score, wherein the highest cumulative score identifies the optimal set of changes that restore the steady state with the least impact to the distributed platform. The selected optimal perturbation specifies an amount of traffic to shift from a steady state deviating PoP to at least one other PoP.

The process continues by selecting (at 670) a specific subset of traffic to shift from the steady state deviating PoP in order to reduce demand at the steady state deviating PoP by the specified amount of the optimal perturbation. The selection is performed with reference to the data models. As noted above, the grandchildren nodes for the child node corresponding to the steady state deviating PoP track demand or percentage load that different customers or customer domains have on the steady state deviating PoP. In some embodiments, the process bases the selection of the subset of traffic on the fewest number of domains that can be shifted to realize the desired shift. This minimizes the number of traffic management configuration changes and the number of impacted customers. In some embodiments, the process bases the selection of the subset of traffic on low priority customers, wherein low priority customers can be determined based on content importance, cost, or prior shifting. In some embodiment, the process bases the selection of the subset of traffic on fairness, whereby no customer is disproportionately shifted from a particular PoP (e.g., round robin shifting of customers).

The process generates (at 680) the zone file or traffic management configuration changes based on the selection of the specific set of traffic to shift and the selected optimal perturbation identifying the one or more destinations for the shifted traffic. The traffic management configuration changes can be specific A, CNAME, ALIAS, or URL records to change in one or more DNS servers that resolve customer requests to the steady state deviating PoP. For example, the policy engine can target the changes to the authoritative DNS servers for the steady state deviating PoP or region of excess demand while leaving other DNS servers unchanged. In some embodiments, the configuration changes are accompanied with a set of rules. The rules restrict when the configuration changes apply. The set of rules can specify IP addresses, ISPs, AS numbers, and other identifiers. The DNS servers then differentiate a first set of clients that are subject to the set of rules from a second set of clients that are not subject to the set of clients. More specifically, requests from the first set of clients associated with restricted IP addresses, ISP, or AS numbers are resolved according to the configuration changes, whereas requests from the different second set of clients that are not associated with any restricted addressing are resolved according to the base or default configuration.

The process reconfigures (at 690) the traffic management operation, including at least the operation of the DNS servers that resolve client requests to the steady state deviating PoP, with the generated zone file or configuration changes. The reconfiguration can also set rules that control the application of the configuration changes. The reconfiguration causes future requests for the subset of traffic to shift from the steady state deviating PoP to the other optimal PoPs.

In some embodiments, a time-to-live (TTL) parameter is associated with the changes. The TTL parameter causes the changes to expire after a certain period of time. After expiration of the TTL, the changes resulting from the reconfiguration are removed and the traffic management operation of the distributed platform is returned back to its base or default configuration.

The state engine and policy engine continually run in order to maintain the distributed platform steady state and adapt to ever-changing demand. In some embodiments, the engines periodically execute or execute in response to triggers from the different PoPs. In some embodiments, the state engine can control when the policy engine is run based on the alerting mechanism described above.

FIG. 7 conceptually illustrates the perturbation scoring in accordance with some embodiments. The figure illustrates a chart 700 with a first row 710 presenting four PoPs 760, 770, 780, and 790 of a distributed platform, a second row 720 presenting current load at each of the four PoPs 760-790 with the load identifying the first PoP 760 as being overloaded or deviating from the steady state, additional rows 730 for a subset of perturbations that restore the distributed platform to a steady state, and columns 740 and 750 scoring each perturbation. The chart 700 is created by the policy engine based on the data models and alert from the state engine, wherein the alert notifies the policy engine of a deviation from the distributed platform steady state.

Each perturbation listed in the chart 700 specifies an amount of traffic to shift from the overloaded first PoP 760 and one or more of the second 770, third 780, and fourth 790 PoPs to receive the amount of shifted traffic. In FIG. 7, each perturbation is associated with a capacity score (see column 740) and a performance score (see column 750). The capacity score quantifies the capacity impact of the load redistribution based on how much traffic is redistributed and resulting loads on the other PoPs. In some other embodiments, the capacity score of column 740 is replaced with one or more scores quantifying the impact of other monitored metrics from which the distributed platform current state is derived. The performance score quantifies the performance impact of the load distribution based on the number and position of destinations that are to receive the shifted traffic resulting from the perturbation.

The highest total score in the chart represents the optimal set of changes for restoring the distributed platform to the steady state. In this figure, the optimal set of changes involve shifting 5% of load from the first PoP 760 to the nearest second PoP 770 and another 5% of load from the first PoP 760 to the more distant third PoP 780 as the second PoP 770 does not have sufficient capacity to absorb all 10% of load from the first PoP 760 and performance associated with shifting all 10% of traffic to the third PoP 780 is worse than the splitting the load shift between the second PoP 770 and the third PoP 780.

In order to implement the perturbation, the policy engine identifies at least a first traffic management change that shifts 5% of traffic from the first PoP 760 to the second PoP 770 and at least a second traffic management change that shifts 5% of traffic from the first PoP 760 to the third PoP 780. These changes are identified by reference to the data models and, more specifically, by reference to the individual load contributions that the different domains served from overloaded PoP have on the total load of the overloaded PoP. From the data models, the policy engine identifies a first subset of domains that if resolved to the second PoP 770 instead of the first PoP 760 will produce an approximate 5% load shift to the second PoP 770, and a different second subset of domains that if resolved to the third PoP 780 instead of the first PoP 760 will produce another approximate 5% load shift to the third PoP 780. For example, the data models may identify that 5.3% of load at the first PoP 760 is for content and services accessible from the a.com domain, 2.5% of load at the first PoP 760 is for content and services accessible from the c.com domain, and another 2.8% of load at the first PoP 760 is for content and services accessible from the g.com domain. Accordingly, the first traffic management change can be implemented by reconfiguring DNS query resolution for the a.com domain from the first PoP 760 to the second PoP 770 and the second traffic management change can be implemented by reconfiguring DNS query resolution for the c.om and g.com domains from the first PoP 760 to the third PoP 780.

Figure 8:
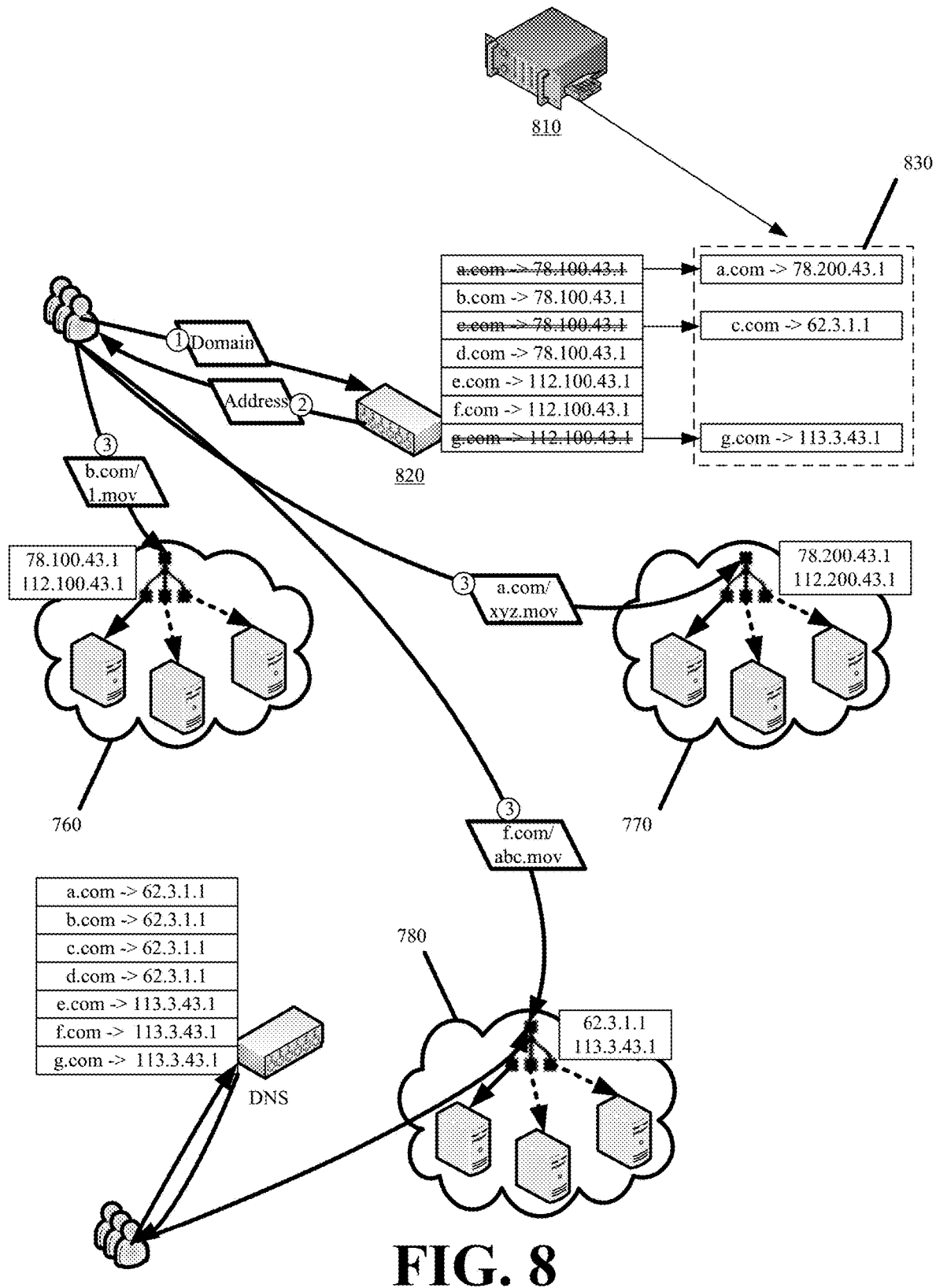
FIG. 8 illustrates reconfiguring traffic management operation in response to the optimal perturbation identified from the scoring in FIG. 7.

FIG. 8 illustrates reconfiguring traffic management operation in response to the optimal perturbation identified from the scoring in FIG. 7. In this figure, the policy engine 810 reconfigures a first set of DNS servers 820 that resolve client issued requests to the first PoP 760 by modifying a set of DNS records 830 from the configuration of the first set of DNS servers 820. In particular, the reconfiguration involves modifying records for the a.com, c.com, and g.com domains such that requests directed to the a.com domain resolve to one of the second PoP 770 addresses instead of the first PoP 760 address specified in the base or default DNS configuration, and requests directed to the c.com or g.com domains resolve to one of the third PoP 780 addresses instead of the first PoP 760 address specified in the base or default DNS configuration, wherein the change in the a.com traffic configuration operation achieves the approximate 5% traffic load from the first PoP 760 to the second PoP 770 and the change in the c.com and g.com traffic configuration operation achieves the approximate 5% traffic load from the first PoP 760 to the third POP 780.

In some embodiments, the reconfigured first set of DNS servers 820 are authoritative DNS servers under distributed platform control. In some other embodiments, the reconfigured first set of DNS servers 820 are authoritative DNS servers not under distributed platform control. In some such embodiments, the DNS servers 820 can be authoritative servers under control of content providers of the a.com, c.com, and g.com domains or third party DNS service providers.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 9:
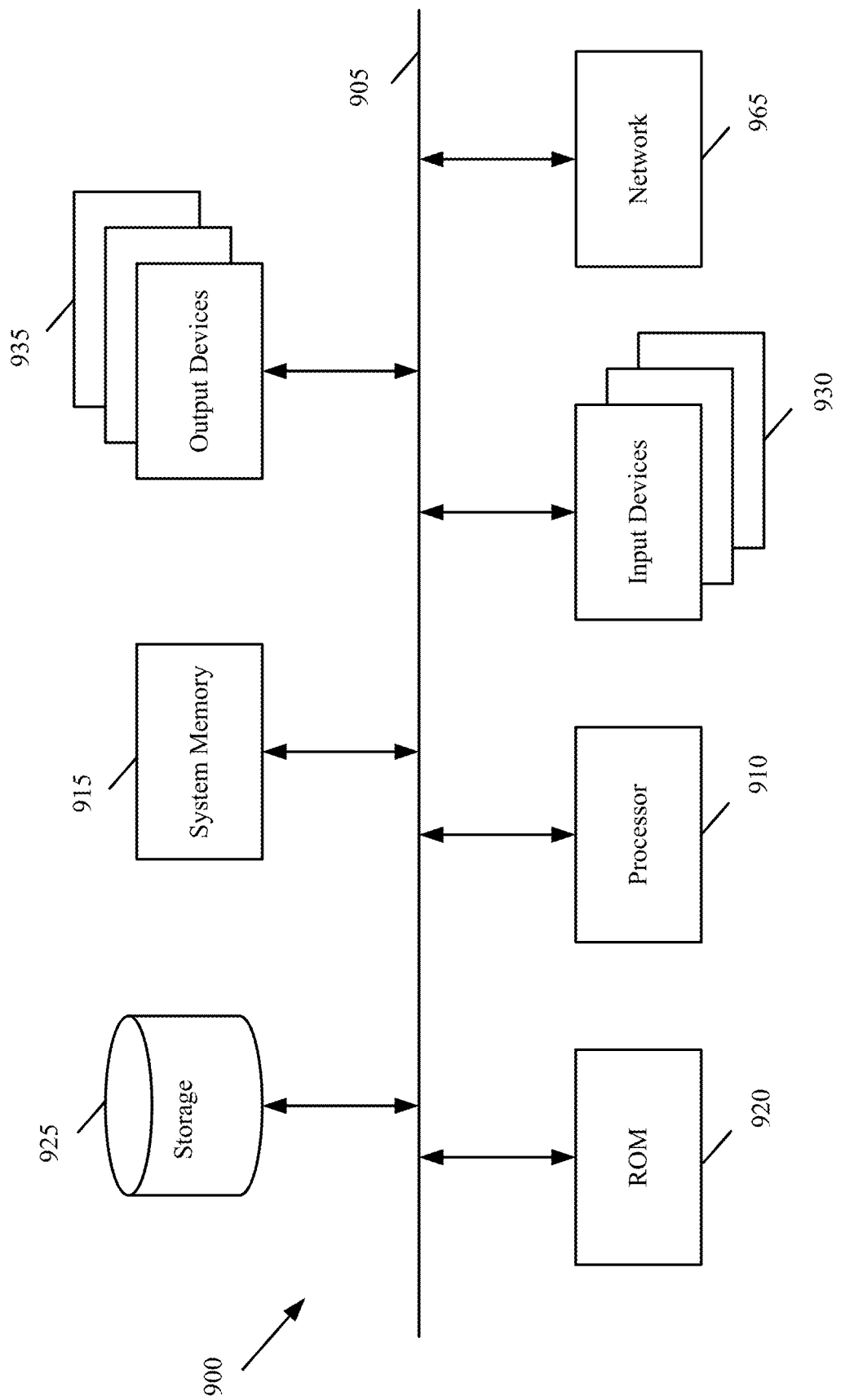
FIG. 9 illustrates a computer system or server with which some embodiments are implemented.

FIG. 9 illustrates a computer system or server with which some embodiments are implemented. Such a computer system includes various types of computer-readable mediums and interfaces for various other types of computer-readable mediums that implement the various methods and machines described above (e.g., request director, caching server, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device. Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A computer-implemented method for maintaining a steady state across a plurality of points-of-presence (PoPs) of a distributed platform, the method comprising:

monitoring at least one state metric relating to performance or resource utilization at each of the plurality of PoPs, wherein each PoP of the plurality of PoPs comprises a plurality of servers operating to serve content to a different geographic region than other PoPs;

detecting deviation from the steady state in response to identifying, from said monitoring, that the at least one state metric at a first PoP of the plurality of PoPs corresponds to a particular amount of load that is in excess of a threshold;

simulating state metric impact and performance impact across the plurality of PoPs resulting from restoring the steady state with different traffic shifting combinations defined in each of a plurality of perturbations, wherein each perturbation of the plurality of perturbations specifies shifting a different amount of load, that is placed on the first PoP by a different subset of domains or customers, to one or more other PoPs;

determining an optimal perturbation from the plurality of perturbations based on said simulating, wherein said determining comprises selecting a perturbation, that minimizes one or more of the state metric impact and the performance impact, as a result of shifting away from the first PoP, one or more specific domains or customers that place a total load on the first PoP equal to the particular amount of load; and modifying traffic management operation according to the optimal perturbation identified from said determining, wherein the optimal perturbation minimizes the state metric impact and the performance impact relative to other perturbations from the plurality of perturbations, and wherein said modifying comprises shifting requests directed to the one or more domains or customers from the first PoP to at least one other PoP of the plurality of PoPs as identified in the optimal perturbation.

2. The computer-implemented method of claim 1, wherein the optimal perturbation comprises at least a different second PoP of the plurality of PoPs with available capacity to absorb the particular amount of load, and wherein the traffic shifting combinations defined by other perturbations of the plurality of perturbations change at least one of a load amount to shift or one or more PoPs from the plurality of PoPs to absorb shifted load.

3. The computer-implemented method of claim 1 further comprising scoring each perturbation of the plurality of perturbations based on (i) an amount of load shifted away from the first PoP to one or more other PoPs and (ii) performance across the plurality of PoPs resulting from the load shifted away from the first PoP.

4. The computer-implemented method of claim 1 further comprising generating a plurality of data models, each data model of the plurality of data models tracking total load at a particular PoP of the plurality of PoPs, and a load contribution from each of a plurality of domains to the total load, wherein each domain of the plurality of domains is accessible from the first PoP.

5. The computer-implemented method of claim 4, wherein modifying the traffic management operation comprises changing at least one Domain Name System (DNS) record at a DNS server, wherein said DNS record resolves requests directed to at least one domain of the plurality of domains with a load contribution at least equal to an excess amount of load at the first PoP exceeding the threshold, and wherein the load contribution of the at least one domain is defined in the plurality of data models.

6. The computer-implemented method of claim 1, wherein modifying the traffic management operation comprises changing at least one Domain Name System (DNS) record from resolving requests directed to at least a particular domain from an address of the first PoP to an address of the at least one other PoP.

7. The computer-implemented method of claim 1 further comprising setting a time-to-live (TTL) parameter with said modifying.

8. The computer-implemented method of claim 7 further comprising reverting said requests from the at least one other PoP back to the first PoP at expiration of the TTL parameter.

9. The computer-implemented method of claim 1, wherein modifying the traffic management operation comprises resolving a subset of requests that produce at least the particular amount of load from the first PoP to the at least one other PoP, wherein the at least one other PoP serves a particular geographic region served by the first PoP with faster performance than other PoPs of the plurality of PoPs with available capacity to absorb the particular amount of load.

10. The computer-implemented method of claim 1, wherein modifying the traffic management operation comprises removing a particular address from Border Gateway Protocol (BGP) route advertisements issued by the first PoP and adding the particular address in BGP route advertisements issued by the at least one other PoP.

11. A method for maintaining a steady state across different points-of-presence (PoPs) of a distributed platform, the method comprising:

generating a plurality of data models based on metrics aggregated from the plurality of PoPs, each of the plurality of data models tracking total load at a different PoP of the plurality of PoPs and further tracking load contributions from each of a plurality of content served from the respective PoP;

detecting deviation from a steady state in response to the plurality of data models tracking the total load at a first PoP of the plurality of PoPs being in excess of a steady state threshold;

computing a capacity score and a performance score for each of a plurality of perturbations, wherein each perturbation of the plurality of perturbations corresponds to a different shift of a different load amount, that is sufficient to restore the steady state, from the first PoP to a different set of the plurality of PoPs, and wherein said computing comprises scoring each shift based on simulated resulting capacity and performance across the plurality of PoPs;

selecting an optimal perturbation from the plurality of perturbations with a highest total capacity score and performance score; and modifying Domain Name System (DNS) operation based on the optimal perturbation, wherein the optimal perturbation shifts a particular load amount away from the first PoP to at least a different second PoP from the plurality of PoPs, and wherein modifying the DNS operation comprises resolving requests directed to a subset of the plurality of content served from the first PoP to the at least second PoP, and wherein load contributions of the subset of content as provided in the data model for the first PoP match the particular load amount of the optimal perturbation.

12. The method of claim 11, wherein modifying the DNS operation comprises changing at least one DNS record controlling resolution of a set of domains associated with the subset of content.

13. The method of claim 11 further comprising serving the subset of content from the first PoP in response to a first set of requests for said subset of content originating, before said modifying, from clients operating in a particular geographic region serviced by the first PoP, and serving the subset of content from the second PoP in response to a subsequent second set of requests for said subset of content originating, after said modifying, from said clients operating in the particular geographic region.

14. The method of claim 11 further comprising resolving a first set of DNS queries, that originate from clients operating in a particular geographic region serviced by the first PoP before said modifying, with a first address of the first PoP, and resolving a subsequent second set of DNS queries, that originate from the clients operating in the particular geographic region after said modifying, with a different second address of the second PoP.

15. The method of claim 11 further comprising aggregating said metrics from different sets of distribution servers forming each of the plurality of PoPs.

16. The method of claim 11, wherein computing the performance score comprises lowering said performance score of each particular perturbation of the plurality of perturbations in response to each additional network hop traversed in delivering said subset of content from a set of PoPs of the particular perturbation to a particular geographic region than traversed in delivering said subset of content from the first PoP to the particular geographic region.

17. The method of claim 16, wherein computing the capacity score comprises lowering said capacity score of each particular perturbation of the plurality of perturbations in response to additional amounts of load the particular perturbation shifts away from the first PoP in excess of load to restore said steady state.

18. A system for maintaining a steady state across different points-of-presence (PoPs) of a distributed platform, the system comprising:
   a state engine generating an alert based on monitoring content delivery performance and available capacity at each PoP of the plurality of PoPs, and the content delivery performance or the available capacity at the first PoP of the plurality of PoPs deviating from a steady state;
   a policy engine simulating, in response to said alert, expected content delivery performance and expected available capacity at each PoP of the plurality of PoPs resulting from shifting each of a plurality of traffic increments away from the first PoP to each of different sets of the plurality of PoPs; and
   at least one Domain Name Server (DNS) shifting an optimal amount of traffic from the first PoP to at least a second PoP from the plurality of PoPs based on at least one DNS record change, wherein said optimal amount of traffic and the at least second PoP are identified as providing expected content delivery performance and expected available capacity across the plurality of PoPs that is better than expected content delivery performance and expected available capacity resulting from shifting other traffic increments to other sets of PoPs based on said simulating of the policy engine, and wherein the at least one DNS record change results in the at least one DNS server resolving requests directed to a subset of the plurality of content served from the first PoP to the at least one second PoP.

19. The system of claim 18 further comprising different sets of distribution servers forming the plurality of PoPs, wherein the subset of content is served from a first set of distribution servers forming the first PoP before said shifting, and wherein the subset of content is served from a different second set of distribution servers forming the at least one second PoP after said shifting.

* * * * *